Patented Mar. 11, 1924.

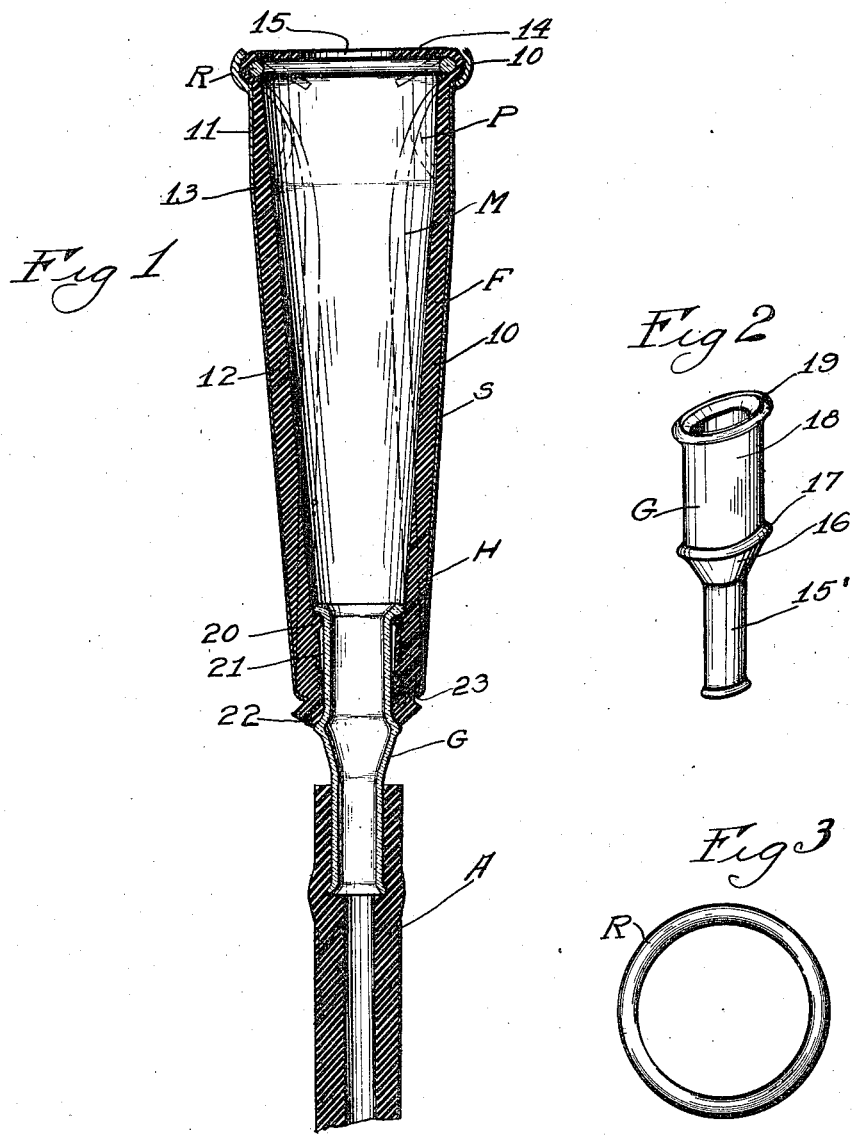

1,486,182

UNITED STATES PATENT OFFICE.

FRANK S. FROST, OF CHICAGO, ILLINOIS, ASSIGNOR TO SEARS, ROEBUCK & CO., OF CHICAGO, ILLINOIS, A CORPORATION OF NEW YORK.

TEAT CUP.

Application filed December 3, 1919. Serial No. 343,408.

*To all whom it may concern:*

Be it known that I, FRANK S. FROST, a citizen of the United States, residing at Chicago, in the county of Cook and State of Illinois, have invented certain new and useful Improvements in Teat Cups, of which the following is a specification.

My invention relates to milking machines and more specifically to an improved teat cup adapted to hang on the teat of a cow and to have connection to means for creating suction, to extract milk from the teat.

The general object of my invention is to extract milk from the teat by the simultaneous action of vacuum or suction, and mechanical manipulation or massaging.

A further object is to provide a teat cup which may be used in connection with a milking machine employing only one suction tube and which will perform the action above outlined without the use of valves or complicated mechanisms of any sort. Most devices which manipulate the teat have hitherto been connected through two passageways to two automatically controlled sources of pressure or suction, necessitating relatively complicated pumping apparatus, and two connecting tubes for each teat cup. Moreover, none of the machines employing two passageways operate to withdraw the milk by the simultaneous action of suction and massaging.

Other special objects are to provide a convenient means of holding the inflation and the casing in assembled relation and an advantageous arrangement for holding a connecting tube in the bottom of the inflation.

Further objects and advantages of my invention will become apparent as the description proceeds.

In the accompanying drawings Fig. 1 is a sectional view of an assembled teat cup embodying the principles of my invention. Fig. 2 is a perspective view of the glass connecting tube and Fig. 3 is a view of the upper reinforcing ring.

The device selected for illustration comprises a metal casing S, a rubber inflation F fitting closely within said casing, a reinforcing ring R and a glass connecting tube G. A suitable conduit illustrated as a rubber tube A may be connected to the lower end of the glass tube G to connect with any desired device for creating suction.

The casing S as clearly illustrated in the drawings is slightly tapered toward its lower end and at its upper end has an annular bead 10 immediately below which I have shown a short approximately cylindrical portion 11. The precise shape of the casing, however, may be varied to suit requirements.

The rubber inflation F, when not distorted by suction, fills the casing S, and comprises a main portion 12, the walls of which taper very gradually from the bottom up to the point 13 and subsequently somewhat more rapidly terminating in an inwardly directed lip or diaphragm 14 having a central aperture 15 adapted to receive the teat of the cow.

Any suitable means for holding the inflation F and the casing S in proper assembled relationship may be employed. In the embodiment illustrated in the drawings the inflation F is inserted in the casing S from the top, the ring R being first slipped inside the inflation through the aperture 15. The ring R is of such a size as to be forced by a moderate pressure into the annular portion 10 of the casing thereby locking the inflation from being withdrawn from the casing, or, more appropriately, restraining the casing from falling off the inflation.

The tube G is inserted from the top and pushed into the position shown in Fig. 1. While any suitable tube may be employed I have illustrated a particularly advantageous conformation of the tube and the parts of the inflation engaging the tube. The tube comprises a lower cylindrical portion 15' adapted to be connected to the conduit A, an enlarged or conical portion 16, a bead 17, an upper cylindrical portion 18 materially smaller than the bead 17, and an upper bead 19 somewhat larger than the bead 17. The inflation has an internal bead 20 of such a size that the bead 17 can be forced through it by moderate pressure but the bead 19, being larger, will be firmly held. Below the bead 20 is a cylindrical portion 21 the internal diameter of which is a trifle larger than the cylindrical portion 18 so that the rubber does not bear against the glass. The tube is forced down until the bead 17 passes the lower contracted end 22 of the inflation, the material of which, when the tube is in place, slopes inwardly against the upper surface of the bead 17 to resist upward movement of the tube. In an arrangement of this sort it is not difficult to proportion the parts so that the bead 19 will securely hold the tube in the inflation while conduit A is removed by pulling it off and such that bead 17 will encounter sufficient resistance so that conduit A can readily be put in place without shoving the tube up into the inflation.

When all the parts are in the position shown the end 22 has been forced out by the insertion of the tube G to bear against the lower inwardly directed flange 23 of the casing S and hold the lower end of the inflation from upward motion with respect to the casing. The relative lengths of the casing and inflation are such that the body of the inflation must be elongated a trifle so that the inflation bears against the lower portion of bead 10 and against flange 23 providing air tight joints at both places.

A small hole H in the casing S near its lower end allows air to enter between the inflation and the shell when suction is exerted inside the inflation.

The operation of my device is as follows:

The cup being placed in operative position on the teat, the initial suction will partially collapse the inflation first in the region above point 13 where its diameter is largest and its wall thinnest throwing this portion into the position illustrated by the dotted lines P. This will close the upper end of the teat trapping a teat full of milk. As the suction continues air flowing in through the hole H will increase the effectiveness thereof, causing gradual contraction of the entire inflation from the top downward into the position indicated in the dot and dash lines M. The lip 14 may also be deflected downward more or less as indicated in dotted lines by the tendency of the teat to enter the cup.

When the suction is relieved the inflation expands again to the initial position allowing the teat to refill with milk. This expansion is retarded by the air between the inflation and the casing which can escape only gradually through the hole H, due partly to the restricted size of the hole itself and also because the inflation fits closely within the casing over the hole and thus restrains the passage of air therethrough.

The suction may be entirely relieved in which case the aperture 15 should be small enough to maintain contact with the teat and support the weight of the cup and associated tubing either with or without the aid of a belt or surcingle; or it may be only partially relieved, sufficient suction being retained to hold the cup in place but nevertheless allowing the walls of the inflation to expand to the initial position.

It will be seen that the disclosed embodiment of my invention comprises only four parts, only two of which, the casing and the inflation, are necessarily involved in the operation above described and that the cup may be used in connection with almost any of the well known types of milking machine apparatus adapted to deliver intermittent suction with either partial or complete suction release. My device is particularly advantageous in that the extent of the massaging action may be easily varied by varying the size of the hole H to obtain the amount of massaging found most advantageous.

The method of retaining the glass tube G in the inflation has been found to be more reliable than one in which there is frictional engagement with the inflation throughout the entire portion of the tube entering the inflation, as the surface of the rubber is, after long use, slightly affected by the action of the milk and the liquids employed to clean the cup so that frictional attachments are unreliable. It also eliminates difficulty in inserting the tube due to the piling up or flowing of the more or less plastic rubber of which the inflation is composed caused by the friction of the glass against the rubber.

The cylindrical portions 15' and 18 of the glass tube G are united by the enlarged or conical portion 16 which expands to an inside diameter slightly larger than the upper cylinder and during the discharge of milk from the udder, has its inner walls completely flooded with milk. It has been found that milk flowing down my improved connecting tube will drain off the surface and leave clear glass exposed sooner than in the case of an ordinary tube. This is an important feature as it is ordinarily necessary to disconnect or remove the teat cup as soon as the cow is milked dry to avoid injury to the cow by prolonged sucking and massaging on an empty teat. It is preferable to have this detecting means associated with each teat cup as in some instances the different teats of the cow will not all be milked dry at the same time. It is also possible when the operator handling the device is careless to get the teat into the cup with the end doubled over on itself. In such an event without means for observing the flow from each cup the teats properly inserted would give milk, the improper condition of the doubled or cramped teat would not be apparent, and the milking action on the doubled teat would be apt to injure the cow.

While I have described and illustrated in detail a specific embodiment of my invention, it should be clearly understood that the description is only for purposes of illustration and that many modifications and variations will naturally occur to those skilled in the art. I aim in the subjoined claims to cover all such legitimate variations and modifications.

I claim as my invention:

1. A teat cup for milking machines having, in combination, a tubular rigid casing, a collapsible or compressible tubular inflation fitting within said casing, an air-tight joint being provided between the respective ends of the casing and the inflation, means for connecting the interior of said inflation to an intermittent suction creating device, and means comprising a restricted opening which establishes constant communication between the atmosphere and the space between said casing and said inflation but allows only a very gradual flow of air therethrough whereby the sudden collapse and expansion of said inflation is positively prevented, the atmospheric pressure being the sole agent by which external collapsing force on the inflation is effected.

2. A teat cup comprising, in combination, a casing, an inflation within said casing, means for connecting the interior of said inflation to a suction creating device, said casing being apertured to permit the gradual entry of air between said casing and said inflation, the resistance of said inflation to the collapsing effect of the vacuum decreasing gradually toward the upper end of said inflation whereby collapse will occur at the upper end first and then gradually proceed downward.

3. A teat cup for milking machines having, in combination, a tubular rigid casing, a collapsible or compressible tubular inflation fitting within said casing, an air-tight joint being provided between the respective ends of the casing and the inflation, the walls of the inflation increasing gradually in thickness from top to bottom, means for establishing communication between the lower end of said inflation and a source of intermittent suction, said casing being provided with a restricted aperture in its wall adjacent the lower end thereof, said aperture providing communication between the atmosphere and the space between the casing and the inflation whereby atmospheric pressure collapses or compresses the inflation inwardly and gradually from the top to the bottom of the inflation when suction is applied to the latter.

4. A teat cup for milking machines having, in combination, a casing, a collapsible inflation fitting therein, a substantially air-tight joint being provided between the respective adjacent ends of the casing and the inflation, the thickness of the walls of the inflation increasing gradually from top to bottom thereof, and means for subjecting the outside wall of the inflation constantly to atmospheric pressure whereby to cause the inflation to collapse inwardly and gradually from top to bottom thereof during the intermittent periods of applied suction.

5. A teat cup comprising, in combination, a casing, an inflation therein, said casing being provided with an opening to provide communication between the atmosphere and the space between the outside wall of said inflation and the inside wall of said casing, said inflation being of varying thickness from top to bottom and fitting closely within said casing over said opening.

6. A teat cup comprising, in combination, a casing, an inflation therein, said casing being provided with an opening through the wall thereof establishing communication between the atmosphere and the space between the outside wall of said inflation and the inside wall of said casing, said inflation having gradually thickening walls from top to bottom thereof and fitting closely within said casing over said opening, said opening being disposed adjacent the portion of said inflation having walls of greatest thickness.

7. A teat cup comprising, in combination, a casing of tapering form, an inflation of tapering form fitting closely within said casing, said casing and inflation having interfitting portions to prevent relative displacement of said inflation and said casing, said casing being provided with an opening through the wall thereof adjacent the lower end to permit the passage of air in between said inflation and said casing, said inflation having its walls of gradually increasing thickness from the top to the bottom thereof and normally covering said opening with the thickest walled portion thereof, said inflation upon the application of suction to the interior thereof being adapted to collapse gradually from top to bottom, said inflation collapsing at the thinnest walled portion first and collapsing progressively and gradually downwardly toward the thickest walled portion and vice versa in returning to its normal expanded condition, the thickest walled portion being first to expand and being followed progressively in this action upwardly toward the thinnest walled portion, the admission of air through said opening being correspondingly restrained as the thickest wall portion is collapsed and expanded.

8. A teat cup comprising, in combination, a casing of tapering form, an inflation of tapering form fitting closely within said casing, said casing and inflation having interfitting portions to prevent relative displacement of said inflation and said casing, said casing being provided with an opening through the wall thereof to permit the passage of air in between said inflation and said casing, said inflation having its walls of gradually increasing thickness from top to the bottom thereof and normally covering said opening, said inflation upon the application of suction to the interior thereof being adapted to collapse gradually from top to bottom, said inflation collapsing at the thinnest walled portion first and collapsing progressively and gradually downwardly toward the thickest wall portion and vice versa in returning to its normal expanded condition, the thickest walled portion being first to expand and being followed progressively in this action upwardly toward the thinnest walled portion, the admission of air through said opening being correspondingly restrained as said inflation is collapsed and expanded.

In testimony whereof, I have hereunto set my hand.

FRANK S. FROST.